United States Patent
Choi et al.

(10) Patent No.: US 8,976,899 B2
(45) Date of Patent: Mar. 10, 2015

(54) APPARATUS AND METHOD FOR TRANSMITTING/RECEIVING DATA IN MOBILE COMMUNICATION SYSTEM

(75) Inventors: Jongsoo Choi, Walton on Thames (GB); Seung Hoon Hwang, Seoul (KR); Byoung Jo Choi, Incheon (KR); Young Bum Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 367 days.

(21) Appl. No.: 13/295,655

(22) Filed: Nov. 14, 2011

(65) Prior Publication Data
US 2012/0128093 A1    May 24, 2012

(30) Foreign Application Priority Data
Nov. 11, 2010    (KR) .......................... 10-2010-0111902

(51) Int. Cl.
*H04L 27/00*    (2006.01)
*H04L 5/00*    (2006.01)
*H04L 27/34*    (2006.01)

(52) U.S. Cl.
CPC .......... *H04L 5/0023* (2013.01); *H04L 27/3405* (2013.01)
USPC ............ 375/299; 375/267; 375/295; 455/101

(58) Field of Classification Search
USPC ........................... 375/267, 295, 299; 455/101
See application file for complete search history.

(56) References Cited

U.S. PATENT DOCUMENTS

2011/0307766 A1* 12/2011 Picchi et al. .................. 714/783

* cited by examiner

*Primary Examiner* — Leila Malek
(74) *Attorney, Agent, or Firm* — The Farrell Law Firm, P.C.

(57) ABSTRACT

Methods and apparatus are provided for transmitting/receiving data in consideration of carrier frequency in the mobile communication system using multiple transmission antennas for increasing data rate and system throughput. A number of antennas and a plurality of symbols are determined via an in-phase domain and a quadrature-phase domain. The symbols are mapped according to the number of antennas and the in-phase domain and the quadrature-phase domain. The mapped symbols are transmitted through corresponding antennas.

10 Claims, 8 Drawing Sheets

APPARATUS AND METHOD FOR TRANSMITTING/RECEIVING DATA IN MOBILE COMMUNICATION SYSTEM

PRIORITY

This application claims priority under 35 U.S.C. 119(a) to an application filed in the Korean Intellectual Property Office on Nov. 11, 2010, and assigned Serial No. 10-2010-0111902, the contents of which are incorporated herein by reference.

BACKGROUND OF THE INVENTION

1. Field of the Invention

The present invention relates generally to a method and apparatus for transmitting/receiving data in a mobile communication system, and more particularly, to a method and apparatus for transmitting/receiving data in consideration of carrier frequency in the mobile communication system using multiple transmission antennas for increasing data rate and system throughput.

2. Description of the Related Art

Orthogonal Frequency Division Multiplexing (Multiple Access) (OFDM(A)) has been adopted as a multi-carrier multiple access scheme for most evolved $3^{rd}$ generation wireless communication technologies including, for example, $3^{rd}$ Generation Partnership Project (3GPP) Long Term Evolution (LTE), 3GPP LTE-Advanced (LTE-A), and Institute of Electrical and Electronics Engineers (IEEE).

In a downlink portion of a wireless communication system that adopts multi-carrier multiple access, a base station (e.g., evolved Node B (eNB)) allocates resources to the terminal (e.g., User Equipment (UE) or Mobile Station (MS)) for data transmission in units of Resource Blocks (RBs), which are composed of a plurality of subcarriers and a plurality of OFDM symbols.

A Space Frequency Block Code (SFBC) technique has been considered as a transmit diversity scheme in present 3GPP LTE downlinks for a base station with two antennas. When there is a base station with 4 antennas, SFBC and Frequency Switched Transmit Diversity (FSTD) can be used. This technique is advantageous with respect to transmission spatial correlation and simplification of receiver implementation of a terminal.

This transmit diversity technique is implemented based on Orthogonal Frequency Division Multiplexing (OFDM). For a base station having two or four antennas, the symbols are transmitted on corresponding subcarriers, and two antennas and 2 subcarriers are added when operating in a combination of SFBC and FSTD.

However, general communication systems, including, for example, 3GPP GSM EDGE Radio Access Network (GE-RAN), are designed without taking OFDM into account. For 3GPP GERAN, dual carrier transmission is included as an optional technique in release 7 or later. Although SFBC can be considered, it is not possible to adopt the combination of SFBC and FSTD schemes.

SUMMARY OF THE INVENTION

The present invention has been made to address at least the above problems and/or disadvantages and to provide at least the advantages described below. Accordingly, an aspect of the present invention to provides a method and apparatus for transmitting/receiving data using transmit diversity technique.

In accordance with an aspect of the present invention, a method is provided for data transmission in a transmitter having at least two antennas. A number of antennas and a plurality of symbols are determined via an in-phase domain and a quadrature-phase domain. The symbols are mapped according to the number of antennas and the in-phase domain and the quadrature-phase domain. The mapped symbols are transmitted through the at least two antennas.

In accordance with another aspect of the present invention, a method is provided for data reception in a receiver. When symbols are received, a number of antennas and a number of carriers that are used to transmit the symbols are determined. The symbols are demodulated according to the number of antennas and the number of carriers.

In accordance with an additional aspect of the present invention, a data transmission apparatus is provided. The apparatus includes a modulator that determines a number of antennas and a plurality of symbols via an in-phase domain and a quadrature-phase domain. The apparatus also includes a symbol mapper that maps the plurality of symbols according to the number of antennas and the in-phase domain and the quadrature-phase domain. The apparatus further includes at least two antennas that transmit the mapped symbols.

In accordance with a further aspect of the present invention, a data reception apparatus includes a decoder that determines, when symbols are received, a number of antennas and a number of carriers that are used to transmit the symbols. The apparatus also includes a demodulator that demodulates the symbols according to the number of antennas and the number of carriers.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
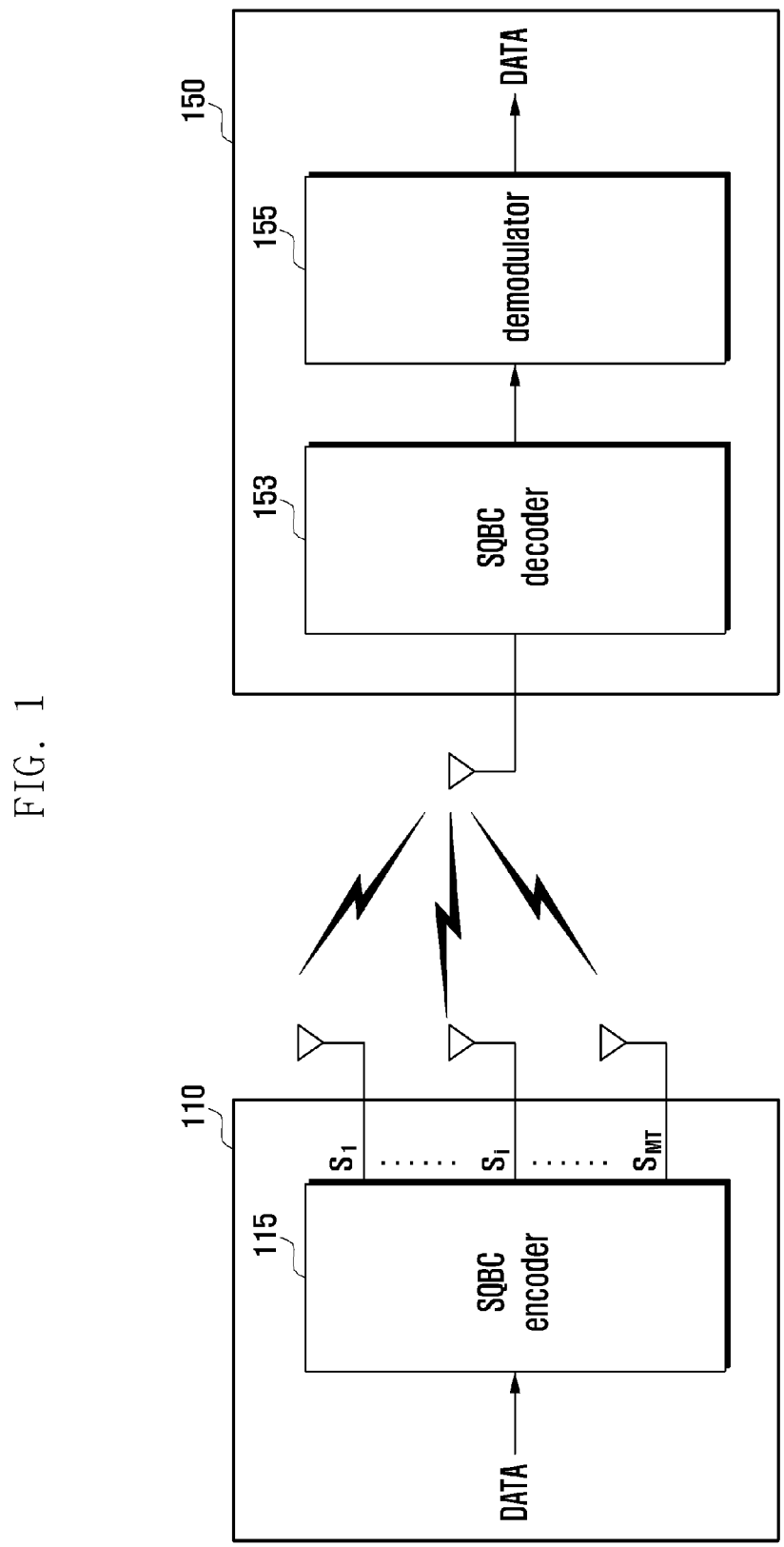
FIG. 1 is a schematic block diagram illustrating a mobile communication system, according to an embodiment of the present invention.

Embodiments of the present invention are described in detail with reference to the accompanying drawings in detail.

The same or similar components may be designated by the same or similar reference numerals although they are illustrated in different drawings. Detailed descriptions of constructions or processes known in the art may be omitted to avoid obscuring the subject matter of the present invention.

The present invention provides a method for transmitting and receiving data using transmit diversity based on SFBC and FSTD in a various communication systems.

SFBC is a frequency domain channel coding technique applicable to a base station having two antennas. SFBC can be expressed as shown in Equation (1) below. Here, s0 and s1 denote symbols.

$$\begin{array}{c} \text{carrier1} \quad 2 \\ \text{antenna } 0 \begin{bmatrix} s0 & s1 \\ -s1* & s0* \end{bmatrix} \end{array} \quad (1)$$

When the base station has 4 antennas, a transmit diversity technique, which is based on the combination of SFBC and FSTD, can be adopted. FSTD is a transmit diversity technique transmitting symbols as switched between antennas. The base station assigns the symbols as shown in Equation (2) below. Here, s0, s1, s2, and s3 denote symbols.

$$\begin{array}{c} \text{carrier1} \quad 2 \quad 3 \quad 4 \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \end{array} \quad (2)$$

SFBC and FSTD are diversity techniques that are based on an OFDM scheme. Embodiments of the present invention propose a transmit diversity technique for use in a communication system designed without consideration of OFDM.

In a communication system such as 3GPP GERAN, the symbols carrying the data to be transmitted are divided between two bands and then modulated into In-phase (I) and Quadrature-phase (Q) signals with a phase difference of $\phi/2$. The modulated data is transmitted to the terminal in a combined manner. The phases at which the data is modulated is referred to as an I domain and a Q domain, respectively. Assuming that the symbols modulated on the same carrier are transmitted, the symbols are transmitted on the subcarriers in OFDM-based communication system, while the symbols are transmitted on the I domain and the Q domain in the non-OFDM communication system.

Space Quadrature Block Code (SQBC) is a transmit diversity technique for transmitting symbols in the I domain and the Q domain. Unlike SFBC, in which the symbols are mapped to antennas and subcarriers, SQBC maps the symbols to antennas and domains depending on the number of symbols.

FIG. 1 is a schematic block diagram illustrating a mobile communication system, according to an embodiment of the present invention.

Referring to FIG. 1, the mobile communication system includes a transmitter 110 and a receiver 150.

The transmitter 110 maps the symbols according to the transmit diversity scheme proposed in embodiments of the present invention. The transmitter 110 is provided with a plurality of antennas. The transmitter 110 modulates the 2 or 4 symbols carrying the data to be transmitted into transmit symbols by means of an SQBC encoder 115.

The SQBC encoder 115 determines spaces to transmit individual symbols, i.e. antennas. The SQBC encoder 115 determines the domain to which the symbols are mapped. The domains to which the symbols are mapped can be categorized into the I domain and the Q domain. The transmitter 110 can check the numbers of antennas and carriers through which the symbols carry the data using the I domain and the Q domain. The transmitter 110 can map the symbols according to the numbers of antennas and carriers. The transmitter 110 can transmit the symbols mapped to the individual antennas among symbols mapped to at least two antennas.

The receiver 150 estimates channels using symbols transmitted by the transmitter 110 by means of an SQBC decoder 153. The channel-estimated symbols are processed by a demodulator 155 so as to output the transmitted data. The receiver 150 determines whether the channel-estimated symbols are transmitted through the same antenna or the same carrier such that the demodulator 155 process the data based on the determination result. Specifically, the I domain and the Q domain carrying the symbols are orthogonal with each other, resulting in no inter-domain interference.

When the symbols are transmitted through the same antenna and the same carrier, the orthogonality is not guaranteed due to channel estimation error and channel interference. In order to avoid inter-symbol interference, the receiver 150 can be provided with an interference canceller. When the symbols are transmitted through different antennas and different carriers, the receiver 150 demodulates the channel-estimated symbols according to the mapping conditions without needing the interference canceller.

Figure 2:
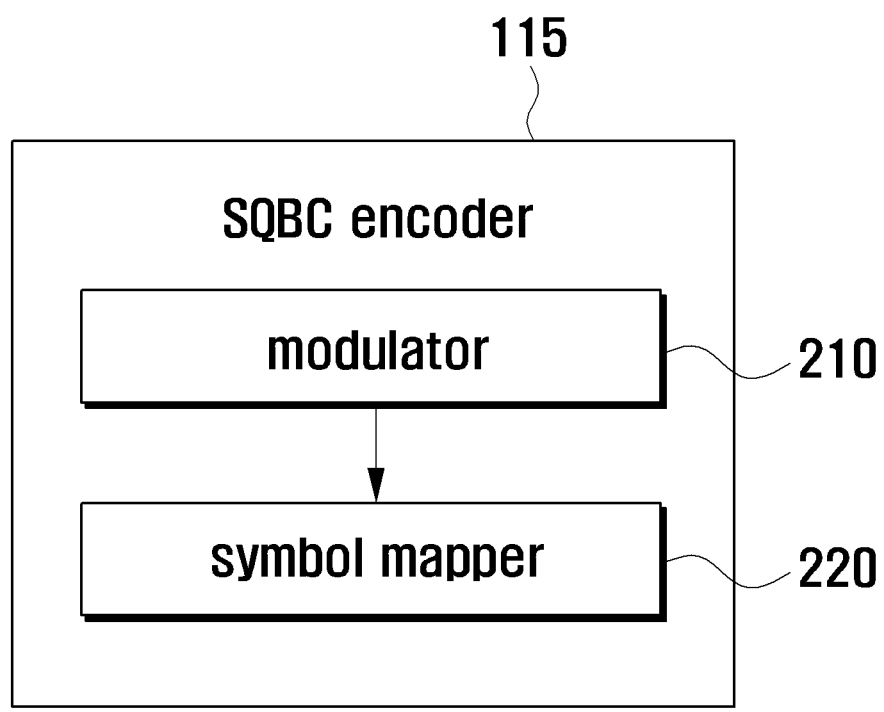
FIG. 2 is a block diagram illustrating a configuration of an encoder, according to an embodiment of the present invention.

FIG. 2 is a block diagram illustrating a configuration of an encoder, according to an embodiment of the present invention.

Referring to FIG. 2, the SQBC encoder 115 includes a modulator 210 and a symbol mapper 220.

The modulator 210 is responsible for modulating transmission symbols carrying data. The symbol mapper 220 maps the symbols according to the numbers of the antennas and carriers to be used for transmitting the symbols. The symbol mapper 220 checks whether the number of antennas to be used for transmitting symbols is 2 or 4, and maps the symbols according to whether the number of carriers to be used for transmitting the symbols is 1 or 2.

Embodiments of the present invention provide a method for transmitting symbols in an SQBC scheme in the communication system using the I domain and the Q domain. A description of a method for modulating symbols in the I domain and the Q domain is set forth in greater detail below.

Figure 3:
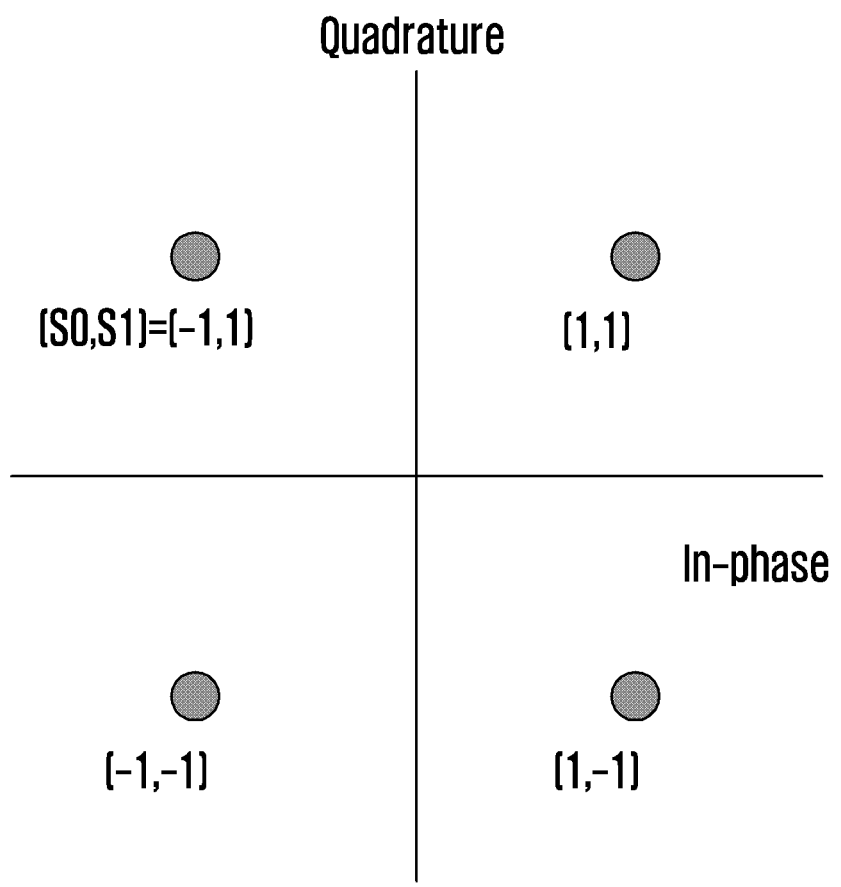
FIG. 3 is a diagram illustrating a Phase Shift Keying (PSK) signal constellation for transmitting symbols, according to an embodiment of the present invention.

FIG. 3 is a diagram illustrating a PSK signal constellation for transmitting symbols, according to an embodiment of the present invention.

Referring to FIG. 3, the symbols are mapped in PSK. PSK is a modulation scheme in which the data is carried in the phase of a sine wave, which is used as a carrier. In PSK, the carrier having a predetermined amplitude is divided into 2 sections (having a phase difference of 180 degrees), 4 sections (having phase difference of 90 degrees), or 8 sections (having a phase difference of 45 degrees) to transmit the symbols differentiated by phase. FIG. 3 shows the symbols mapped to 8 different phases of the carrier wave FIG. 4 is a diagram illustrating a QAM signal constellation for transmitting symbols, according to an embodiment of the present invention.

Figure 4:
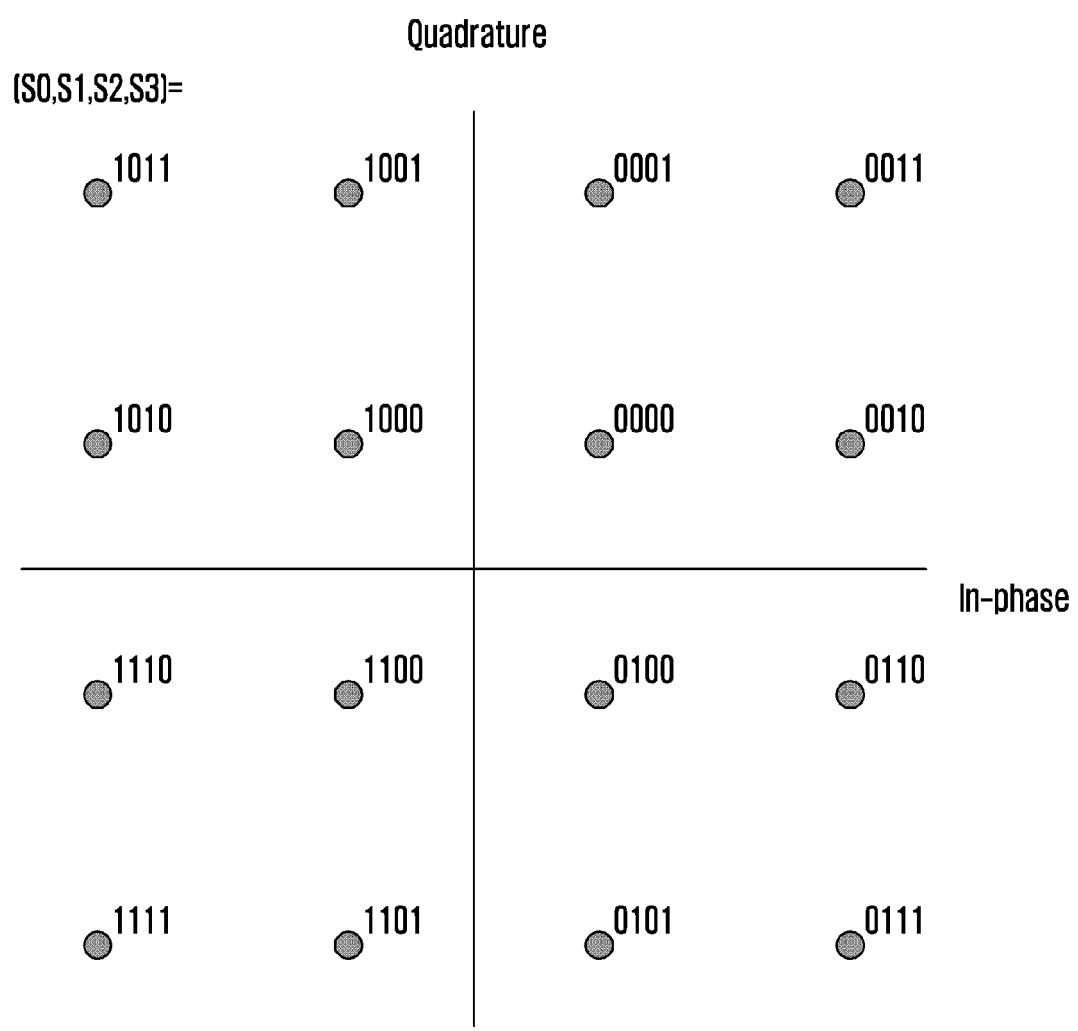
FIG. 4 is a diagram illustrating a Quadrature Amplitude Modulation (QAM) signal constellation for transmitting symbols, according to an embodiment of the present invention.

Referring to FIG. 4, the symbols can be mapped in a QAM scheme. QAM is a modulation scheme in which a predetermined quantity of digital signals is conveyed by changing a carrier signal and phase. QAM can use the size as a variable as well as the phase, unlike PSK. As shown in FIG. 4, the symbols quantized into 16 levels are mapped to the distributed 16 coordinates in the I domain and the Q domain.

The transmitter 110 transmits the symbols modulated in the above-described modulation scheme in SQBC. SQBC is a transmit diversity scheme transmitting the symbols mapped using the I domain and the Q domain. When using SQBC for symbol transmission, the transmitter 110 checks the numbers of antennas and carriers for symbol transmission and the number of symbols to be transmitted, and transmits the symbols according to formulas described in greater detail below. The embodiments of the present invention described herein are directed to situations in which the number of transmit antennas is 2 or 4, the number of carrier is 1 or 2, and the number of symbols to be transmitted is 2 or 4.

When the first condition of two transmit antennas, one carrier, and two transmission symbols s0 and s2 is fulfilled, the symbols are mapped as set forth in Equation (3) or (4) below. The transmitter 110 maps the symbols using one of Equations (3) and (4) as first condition formula.

$$\begin{array}{c} \text{in-phase}(I) \quad \text{quadrature}(Q) \\ \text{antenna } 0 \begin{bmatrix} s0 & s1 \\ -s1* & s0* \end{bmatrix} \\ \text{antenna } 1 \end{array} \quad (3)$$

$$\begin{array}{c} \text{quadrature}(Q) \quad \text{in-phase}(I) \\ \text{antenna } 0 \begin{bmatrix} s0 & s1 \\ -s1* & s0* \end{bmatrix} \\ \text{antenna } 1 \end{array} \quad (4)$$

Equations (3) and (4) are identical in symbol mapping, with the exception that symbol transmission order in the I domain and the Q domain is changed. Accordingly, the transmitter 110 can transmit the symbols as mapped to the antennas according to the I domain and the Q domain.

When the second condition of two transmit antennas, one carrier, and four transmission symbols s0, s1, s2, and s3 is fulfilled, four symbols are transmitted on the same carrier using the I domain and the Q domain and the QAM scheme. The transmitter 110 can map the symbols using one of Equations (5) and (6) as a second condition formula.

$$\begin{array}{c} I-1 \quad I-2 \quad Q-1 \quad Q-2 \\ \text{antenna } 0 \begin{bmatrix} s0 & s1 & s2 & s3 \\ -s1* & s0* & -s3* & s2* \end{bmatrix} \\ \text{antenna } 1 \end{array} \quad (5)$$

$$\begin{array}{c} I-1 \quad I-2 \quad Q-1 \quad Q-2 \\ \text{antenna } 0 \begin{bmatrix} s0 & s1 & s2 & s3 \\ -s1* & s0* & -s3* & s2* \end{bmatrix} \\ \text{antenna } 1 \end{array} \quad (6)$$

Equations (5) and (6) are identical in symbol mapping, with the exception being the order of the I domain and the Q domain. Using Equations (5) or (6), the transmitter 110 maps four symbols in the I domain and the Q domain and transmits the symbols through two antennas.

When the third condition of two transmit antennas and two carriers is fulfilled, each carrier can have a predetermined bandwidth. The transmitter can map the symbols using Equation (7) as a third condition formula.

$$\begin{array}{c} \text{carrier1} \quad 2 \\ \text{antenna } 0 \begin{bmatrix} s0 & s1 \\ -s1* & s0* \end{bmatrix} \\ \text{antenna } 1 \end{array} \quad (7)$$

Equation (7) is identical with the formula of the SFBC scheme.

When the fourth condition of four transmit antennas, two carriers, and four transmit symbols s0, s1, s2, and s3 is fulfilled, the transmitter multiplexes the symbols on the carriers dividing between the I domain and the Q domain. The transmitter 110 can map the symbols using one of Equations (8), (9), (10), and (11) as a fourth condition formula.

$$\begin{array}{c} \text{carrier1} \quad 2 \\ \text{antenna } 0 \begin{bmatrix} s0 & s1 \\ -s1* & s0* \end{bmatrix} \\ \text{antenna } 1 \end{array} \quad (8)$$

$$\begin{array}{c} \text{carrier1}/Q \quad 1/I \quad 2/Q \quad 2/I \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \\ \text{antenna } 1 \\ \text{antenna } 2 \\ \text{antenna } 3 \end{array} \quad (9)$$

$$\begin{array}{c} \text{carrier1}/Q \quad 1/I \quad 2/Q \quad 2/I \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \\ \text{antenna } 1 \\ \text{antenna } 2 \\ \text{antenna } 3 \end{array} \quad (10)$$

$$\begin{array}{c} \text{carrier1}/I \quad 2/Q \quad 1/Q \quad 2/I \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \\ \text{antenna } 1 \\ \text{antenna } 2 \\ \text{antenna } 3 \end{array} \quad (11)$$

Using one of the formulas, the transmitter 110 can transmit the symbols as mapped in the I domain and the Q domain. The rows and columns of each formula can be changed from each other, and the symbols corresponding to individual antennas and carriers can be expressed differently from the definition.

Figure 5:
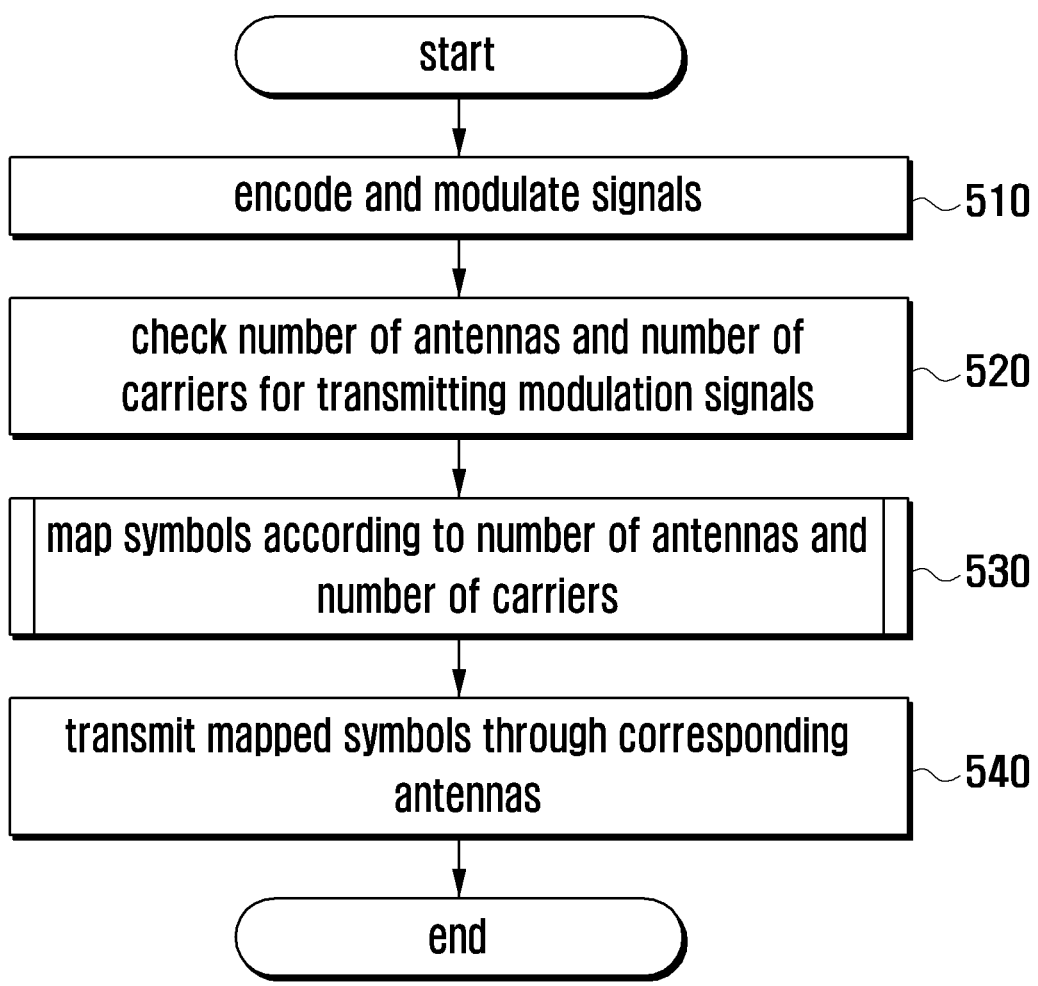
FIG. 5 is a flowchart illustrating a data transmission method, according to an embodiment of the present invention.

FIG. 5 is a flowchart illustrating a data transmission method, according to an embodiment of the present invention.

Referring to FIG. 5, the transmitter 110 performs encoding and modulating on the signal to be transmitted to the receiver, in step 510. The transmitter 110 checks the numbers of antennas and carriers for transmitting the modulation signal, in step 520. The transmitter 110 maps the symbols corresponding to the modulation signals using the formula selected, according to the numbers of antennas and carriers, in step 530. Step 530 is described in greater detail below with reference to FIG. 6. The transmitter 110 transmits the mapped symbols through corresponding antennas, in step 540. The transmitter 110 transmits symbol allocation information indicating a symbol allocation scheme to the receiver 150.

Figure 6:
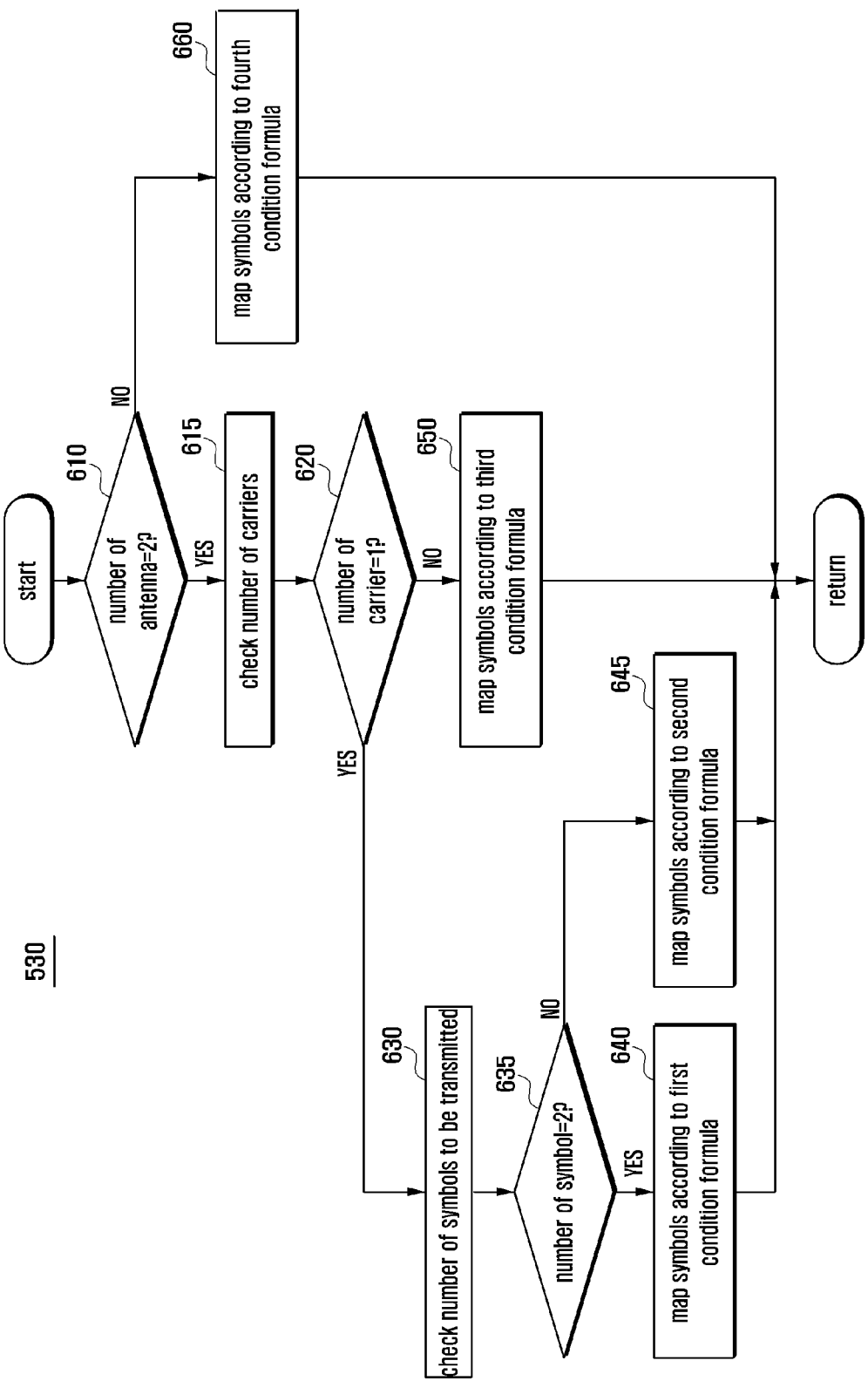
FIG. 6 is a flowchart illustrating a symbol mapping procedure of the data transmission method of FIG. 5, according to an embodiment of the present invention.

FIG. 6 is a flowchart illustrating a symbol mapping procedure of the data transmission method of FIG. 5, according to an embodiment of the present invention.

Referring to FIG. 6, the transmitter determines whether the number of antennas to be used for transmitting symbols is 2, in step 610. If the number of antennas for symbol transmission is 2, the transmitter 110 checks the number of carriers for transmitting the symbols, in step 615.

The transmitter 110 determines whether the number of carriers is 1, in step 620. If the number of carriers is 1, the transmitter 110 checks the number of symbols to be transmitted, in step 630. The transmitter 110 determines whether the number of symbols is 2, in step 635. If the number of symbols is 2, the transmitter 110 maps the symbols according to the first condition formula, in step 640. The first condition formula is a symbol mapping for two antennas, one carrier, and two symbols s0 and s2. The first condition formula can be one of Equations (12) and (13) below.

$$\begin{array}{c} \text{in-phase}(I) \quad \text{quadrature}(Q) \\ \text{antenna } 0 \begin{bmatrix} s0 & s1 \\ -s1* & s0* \end{bmatrix} \\ \text{antenna } 1 \end{array} \quad (12)$$

$$\begin{array}{c} \text{in-phase}(I) \quad \text{quadrature}(Q) \\ \text{antenna } 0 \begin{bmatrix} s0 & s1 \\ -s1* & s0* \end{bmatrix} \\ \text{antenna } 1 \end{array} \quad (13)$$

If, in step 635, it is determined that the number of symbols is not 2, and is 4, for example, the transmitter 110 maps the symbols according to the second condition formula, in step 645. The second condition formula is a symbol mapping for two antennas, one carrier, and four symbols s0, s1, s2, and s3. The second condition formula can be one of Equations (14) and (15) below.

$$\begin{array}{c} \text{in-phase}(I) \quad \text{quadrature}(Q) \\ \text{antenna } 0 \begin{bmatrix} s0 & s1 \\ -s1* & s0* \end{bmatrix} \\ \text{antenna } 1 \end{array} \quad (14)$$

$$\begin{array}{c} Q-1 \quad Q-2 \quad I-1 \quad I-2 \\ \text{antenna } 0 \begin{bmatrix} s0 & s1 & s3 & s2 \\ -s1* & s0* & -s2* & s3* \end{bmatrix} \\ \text{antenna } 1 \end{array} \quad (15)$$

Returning to step 620, if the number of carriers is not 1, and is 2, for example, the transmitter 110 maps the symbols according to the third condition formula, in step 650. The third condition formula is a symbol mapping for two antennas and two carriers. Each carrier can have a predetermined bandwidth. The third condition formula is set forth below in Equation (16).

$$\begin{array}{c} \text{carrier1} \quad 2 \\ \text{antenna } 0 \begin{bmatrix} s0 & s1 \\ -s1* & s0* \end{bmatrix} \\ \text{antenna } 1 \end{array} \quad (16)$$

If, at step 610, the number of antennas for symbol transmission is not 2, and is 4, for example, the transmitter 110 maps the symbols according to the fourth condition formula, in step 660. The fourth condition formula is a symbol mapping for four antennas, two carriers, and four symbols s0, s1, s2, and s3. The transmitter 110 divides the carriers between the I domain and the Q domain and multiplexes the symbols to be transmitted. The fourth condition formula can be one of Equations (17), (18), (19), and (20), according to the domains divided among the carriers.

$$\begin{array}{c} \text{carrier1} \quad 2 \\ \text{antenna } 0 \begin{bmatrix} s0 & s1 \\ -s1* & s0* \end{bmatrix} \\ \text{antenna } 1 \end{array} \quad (17)$$

$$\begin{array}{c} \text{carrier1} \quad 2 \\ \text{antenna } 0 \begin{bmatrix} s0 & s1 \\ -s1* & s0* \end{bmatrix} \\ \text{antenna } 1 \end{array} \quad (18)$$

$$\begin{array}{c} \text{carrier1} \quad 2 \\ \text{antenna } 0 \begin{bmatrix} s0 & s1 \\ -s1* & s0* \end{bmatrix} \\ \text{antenna } 1 \end{array} \quad (19)$$

$$\begin{array}{c} \text{carrier1}/I \quad 2/Q \quad 1/Q \quad 2/I \\ \text{antenna } 0 \\ \text{antenna } 1 \\ \text{antenna } 2 \\ \text{antenna } 3 \end{array} \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \quad (20)$$

In the above-described method, the transmitter 110 maps the transmission symbols in the I domain and the Q domain.

Figure 7:
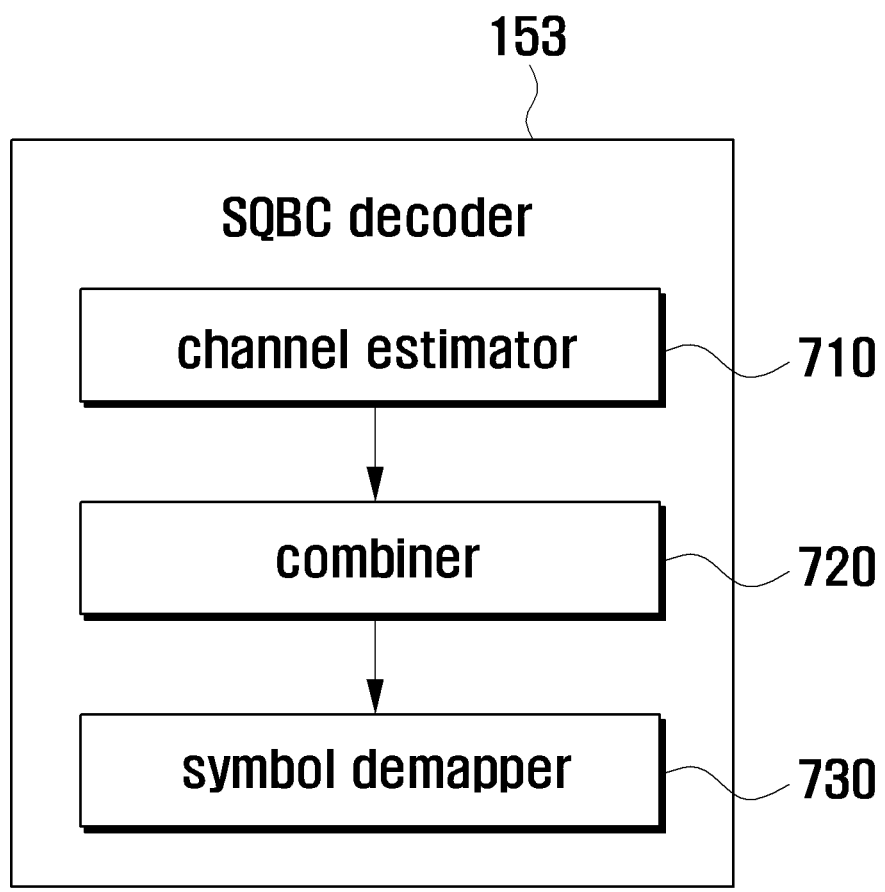
FIG. 7 is a block diagram illustrating a configuration of a decoder of the receiver, according to an embodiment of the present invention.

FIG. 7 is a block diagram illustrating a configuration of a decoder of the receiver, according to an embodiment of the present invention.

Referring to FIG. 7, the SQBC decoder 153 of the receiver 150 includes a channel estimator 710, a combiner 720, and a symbol demapper 730.

The channel estimator 710 is capable of extracting channel estimation information for identifying the antennas and carriers used for transmitting the symbols. The combiner 720 combines the received symbols per antenna and per carrier based on the channel estimation information. The symbol demapper 730 estimates channels based on the symbols received per antenna and per carrier. The symbol demapper 730 can perform channel estimation based on the symbol mapping information transmitted by the transmitter 110.

Figure 8:
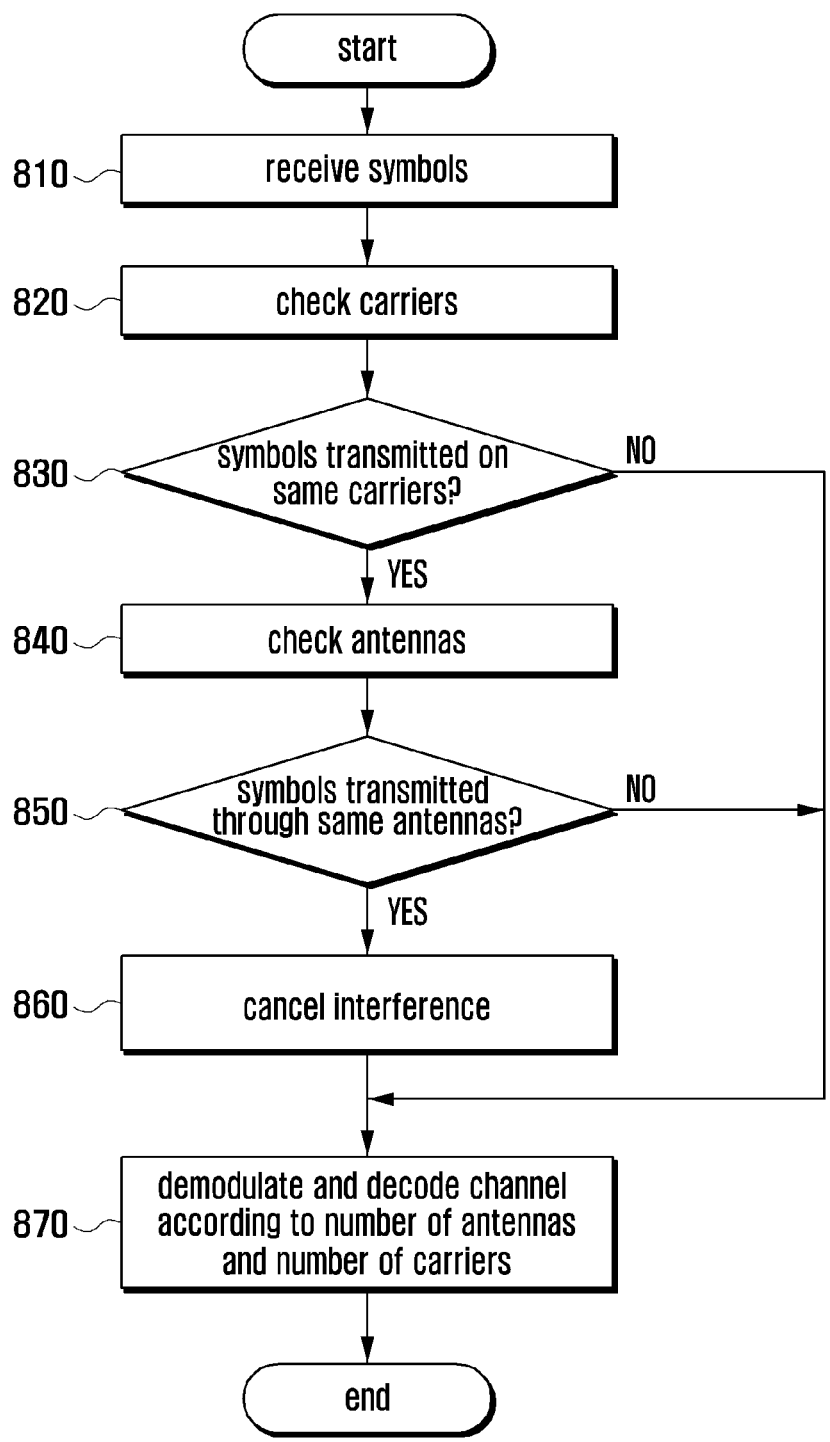
FIG. 8 is a flowchart illustrating a method for receiving symbols, according to an embodiment of the present invention.

FIG. 8 is a flowchart illustrating a method for receiving symbols, according to an embodiment of the present invention.

Referring to FIG. 8, the receiver 150 receives symbol mapping information indicating the symbol mapping scheme transmitted by the transmitter 110 and stores the symbol mapping information. The symbol mapping information includes the information on the formula defined depending on a number of antennas transmitting symbols, a number of carriers on which symbols are transmitted, and a number of symbols transmitted.

The receiver receives signals, in step 810, and checks the carriers on which the signals are transmitted, in step 820. The receiver 150 determines whether the symbols are transmitted on the same carrier, in step 830. If it is determined that the symbols are transmitted on the same carrier, the receiver 150 checks the antennas through which the symbols are transmitted, in step 840.

The receiver 150 determines whether the received symbols are transmitted through the same antenna, in step 850. If the symbols are transmitted through the same antenna, the receiver 150 performs interference cancellation, in step 860. The methodology then proceeds to step 870.

If it is determined that the symbols are not transmitted on the same carrier in step 830, the methodology proceeds to step 870. Further, if it is determined that the symbols are not transmitted through the same antenna in step 850, the methodology proceeds to step 870. The receiver 150 performs channel demodulation and decoding according to the number of antennas and the number of carriers, in step 870. Specifically, the receiver 150 checks the number of antennas through which the symbols are transmitted and the number of carriers on which the symbols are transmitted, according to the symbol mapping information, and performs channel modulation and decoding based on the checking result. The symbol mapping information includes the information on the formula defined according to the number of transmit antennas, the number of carriers, and the number of symbol to be transmitted. The formulas for symbol mapping are described in detail above.

As described above, the data transmission/reception method and apparatus of the embodiments of the present invention is capable of adopting transmission diversity to various communication systems. Also, the data transmission/reception method and apparatus of the embodiments of the present invention is capable of improving the diversity gain of a diversity scheme such as FSTD while reducing number of carriers. Furthermore, the data transmission/reception method and apparatus of the present invention is capable of adopting a transmit diversity scheme robust to spatial correlation to various communication system with a small number of carriers, resulting in reduction of implementation complexity of the receiver.

While the invention has been shown and described with reference to certain embodiments thereof, it will be understood by those skilled in the art that various changes in form and detail may be made therein without departing from the spirit and scope of the invention, as defined by the appended claims.

What is claimed is:

1. A method for data transmission in a transmitter having at least two antennas, the method comprising:
   identifying symbols and a number of carriers that are used to transmit the symbols;
   mapping the symbols based on the number of antennas and the number of carriers; and
   transmitting the mapped symbols through the antennas including a first antenna and a second antenna,
   wherein each of the mapped symbols is transmitted through the first antenna in an in-phase domain and is transmitted through the second antenna in a quadrature-phase domain.

2. The method of claim 1, wherein
   when the number of antennas is 2, the number of carriers is 1, and the symbols are s0 and s1, applying one of the following for symbol mapping:

$$\begin{array}{c} \text{in-phase}(I) \quad \text{quadrature}(Q) \\ \text{antenna 0} \begin{bmatrix} s0 & s1 \\ -s1* & s0* \end{bmatrix} \\ \text{antenna 1} \end{array},$$

and $$\begin{array}{c} \text{in-phase}(I) \quad \text{quadrature}(Q) \\ \text{antenna 0} \begin{bmatrix} s0 & s1 \\ -s1* & s0* \end{bmatrix} \\ \text{antenna 1} \end{array}$$

where I denotes the in-phase domain, and Q denotes the quadrature-phase domain.

3. The method of claim 1, wherein
   when the number of antennas is 2, the number of carriers is 1, and the symbols are s0, s1, s2, and s3, applying one of the following for symbol mapping:

$$\begin{array}{c} \quad I\text{-}1 \quad I\text{-}2 \quad Q\text{-}1 \quad Q\text{-}2 \\ \text{antenna 0} \begin{bmatrix} s0 & s1 & s2 & s3 \\ -s1* & s0* & -s3* & s2* \end{bmatrix} \\ \text{antenna 1} \end{array},$$

and $$\begin{array}{c} \quad I\text{-}1 \quad I\text{-}2 \quad Q\text{-}1 \quad Q\text{-}2 \\ \text{antenna 0} \begin{bmatrix} s0 & s1 & s2 & s3 \\ -s1* & s0* & -s3* & s2* \end{bmatrix} \\ \text{antenna 1} \end{array}$$

where I denotes the in-phase domain, and Q denotes the quadrature-phase domain.

4. The method of claim 1, wherein
   when the number of antennas is 2, the number of carriers is 2, and the symbols are s0 and s1, applying the following for symbol mapping:

$$\begin{array}{c} \quad \text{carrier1} \quad 2 \\ \text{antenna 0} \begin{bmatrix} s0 & s1 \\ -s1* & s0* \end{bmatrix} \\ \text{antenna 1} \end{array}$$

where I denotes the in-phase domain, and Q denotes the quadrature-phase domain.

5. The method of claim 1, wherein
   when the number of antennas is 4, the number of carriers is 2, and the symbols are s0, s1, s2, and s3, applying one of following for symbol mapping:

$$\begin{array}{c} \quad \text{carrier1}/I \quad 2/I \quad 1/Q \quad 2/Q \\ \text{antenna 0} \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \\ \text{antenna 1} \\ \text{antenna 2} \\ \text{antenna 3} \end{array},$$

$$\begin{array}{c} \quad \text{carrier1}/I \quad 1/Q \quad 2/I \quad 2/Q \\ \text{antenna 0} \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \\ \text{antenna 1} \\ \text{antenna 2} \\ \text{antenna 3} \end{array},$$

$$\begin{array}{c} \quad \text{carrier1}/I \quad 1/Q \quad 2/I \quad 2/Q \\ \text{antenna 0} \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \\ \text{antenna 1} \\ \text{antenna 2} \\ \text{antenna 3} \end{array},$$

and $$\begin{array}{c} \quad \text{carrier1}/I \quad 1/Q \quad 2/I \quad 2/Q \\ \text{antenna 0} \begin{bmatrix} s0 & s1 & 0 & 0 \\ 0 & 0 & s2 & s3 \\ -s1* & s0* & 0 & 0 \\ 0 & 0 & -s3* & s2* \end{bmatrix} \\ \text{antenna 1} \\ \text{antenna 2} \\ \text{antenna 3} \end{array},$$

where I denotes the in-phase domain, and Q denotes the quadrature-phase domain.

6. A data transmission apparatus comprising:
   a modulator configured to identify symbols and carriers that are used to transmit the symbols; and
   a symbol mapper configured to map the symbols based on the number of antennas and the number of the carriers,
   wherein the antennas include a first antenna and a second antenna, configured to transmit the mapped symbols, and wherein each of the mapped symbols is transmitted through the first antenna in an in-phase domain and is transmitted through the second antenna in a quadrature-phase domain.

7. The data transmission apparatus of claim 6, wherein when the number of antennas is 2, the number of carriers is 1, and the symbols are s0 and s1, the symbol mapper applies one of the following for symbol mapping:

$$\begin{array}{c} \text{in-phase}(I) \quad \text{quadrature}(Q) \\ \text{antenna } 0 \begin{bmatrix} s0 & s1 \\ -s1* & s0* \end{bmatrix}, \\ \text{antenna } 1 \end{array}$$

and $$\begin{array}{c} \text{quadrature}(Q) \quad \text{in-phase}(I) \\ \text{antenna } 0 \begin{bmatrix} s0 & s1 \\ -s1* & s0* \end{bmatrix} \\ \text{antenna } 1 \end{array}$$

where I denotes the in-phase domain, and Q denotes the quadrature-phase domain.

8. The data transmission apparatus of claim 6, wherein when the number of antennas is 2, the number of carriers is 1, and the symbols are s0, s1, s2, and s3, the symbol mapper applies one of the following for symbol mapping:

$$\begin{array}{c} \quad I\text{-}1 \quad I\text{-}2 \quad Q\text{-}1 \quad Q\text{-}2 \\ \text{antenna } 0 \begin{bmatrix} s0 & s1 & s2 & s3 \\ -s1* & s0* & -s3* & s2* \end{bmatrix}, \\ \text{antenna } 1 \end{array}$$

and $$\begin{array}{c} \quad I\text{-}1 \quad I\text{-}2 \quad Q\text{-}1 \quad Q\text{-}2 \\ \text{antenna } 0 \begin{bmatrix} s0 & s1 & s2 & s3 \\ -s1* & s0* & -s3* & s2* \end{bmatrix} \\ \text{antenna } 1 \end{array}$$

where I denotes the in-phase domain, and Q denotes the quadrature-phase domain.

9. The data transmission apparatus of claim 6, wherein when the number of antennas is 2, the number of carriers is 2, and the symbols are s0 and s1, the symbol mapper applies the following for symbol mapping:

$$\begin{array}{c} \quad \text{carrier1} \quad 2 \\ \text{antenna } 0 \begin{bmatrix} s0 & s1 \\ -s1* & s0* \end{bmatrix} \\ \text{antenna } 1 \end{array}$$

where I denotes the in-phase domain, and Q denotes the quadrature-phase domain.

10. The data transmission apparatus of claim 6, wherein when the number of antennas is 4, the number of carriers is 2, and the symbols are s0, s1, s2, and s3, the symbol mapper applies one of the following for symbol mapping:

$$\begin{array}{c} \quad \text{carrier1}/I \quad 2/I \quad 1/Q \quad 2/Q \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix}, \\ \text{antenna } 1 \\ \text{antenna } 2 \\ \text{antenna } 3 \end{array}$$

$$\begin{array}{c} \quad \text{carrier1}/I \quad 1/Q \quad 2/I \quad 2/Q \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix}, \\ \text{antenna } 1 \\ \text{antenna } 2 \\ \text{antenna } 3 \end{array}$$

$$\begin{array}{c} \quad \text{carrier1}/I \quad 1/Q \quad 2/I \quad 2/Q \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix}, \\ \text{antenna } 1 \\ \text{antenna } 2 \\ \text{antenna } 3 \end{array}$$

and $$\begin{array}{c} \quad \text{carrier1}/I \quad 1/Q \quad 2/I \quad 2/Q \\ \text{antenna } 0 \begin{bmatrix} s0 & s1 & 0 & 0 \\ 0 & 0 & s2 & s3 \\ -s1* & s0* & 0 & 0 \\ 0 & 0 & -s3* & s2* \end{bmatrix}, \\ \text{antenna } 1 \\ \text{antenna } 2 \\ \text{antenna } 3 \end{array}$$

where I denotes in-phase domain, and Q denotes quadrature-phase domain.

\* \* \* \* \*